United States Patent Office 3,089,899
Patented May 14, 1963

3,089,899
PRODUCTION OF METHYL METHACRYLATE USING ZEOLITE CATALYST
James F. Vitcha, New Providence, and Victor A. Sims, Bayonne, N.J., assignors to Air Reduction Company, Incorporated, New York, N.Y., a corporation of New York
No Drawing. Filed June 29, 1961, Ser. No. 120,516
6 Claims. (Cl. 260—486)

This invention relates to the synthesis of methyl methacrylate. More particularly, it relates to an improved catalytic vapor phase synthesis of methyl methacrylate by condensing methyl propionate with formaldehyde.

Methyl methacrylate is used extensively in the manufacture of synthetic resinous polymers and because of a steadily increasing demand for methyl methacrylate, two recently patented processes are of particular interest, namely, Redmon U.S. Patent No. 2,734,074 and Etherington U.S. Patent No. 2,821,543.

The present invention constitutes an improvement over the prior art such as that represented by these two patents, and resides in the discovery of an improved process for obtaining methyl methacrylate which comprises contacting vapor mixtures of methyl propionate and formaldehyde with zeolite catalysts. The catalysts which have been found to be particularly advantageous in the production of methyl methacrylate according to the present invention comprise certain synthetic zeolites, especially the aluminosilicates of group II–A metals, i.e., magnesium, calcium, strontium, and barium aluminosilicates, and manganous aluminosilicates.

The process by which methyl methacrylate is formed according to the process of the present invention may be represented by the following overall reaction:

$$HCHO + CH_3CH_2COOCH_3 \rightarrow CH_2{:}C(CH_3)COOCH_3 + H_2O$$

which probably proceeds via the formation of an intermediate hydroxyester which then loses a molecule of water to yield the desired methyl methacrylate.

The mole ratio of methyl propionate to formaldehyde may be varied from about 2.5:1 to about 50:1. The best results are obtained in the range of about 5:1 to about 15:1. Conversions and yields are high at mole ratios above 15:1, but the methyl methacrylate product is diluted with large amounts of unreacted methyl propionate. Conversely, the concentration of methyl methacrylate in the reaction product is high at mole ratios of 2.5:1 to 5:1, but conversions and yields are below those obtained in the preferred range.

The reaction may be carried out with good yields at temperatures of about 325° to 425° C., but best results are obtained from about 350° to 400° C. The pressure may be either substantially atmospheric, superatmospheric, or subatmospheric. While the reaction proceeds satisfactorily at atmospheric pressure, higher pressures up to about 200 p.s.i.g. can be used advantageously to increase reactor capacity and facilitate recovery of methyl methacrylate. The space velocity may be varied over a wide range, from about 100 to about 6000 liters/hour/liter of catalyst. The higher space velocities within this range are generally used at higher temperatures and elevated pressures.

The formaldehyde reagent can be in the form of any of the commercial solutions, such as aqueous or methanolic formaldehyde, or as anhydrous paraformaldehyde. Substantially the same conversions and yields are obtained with any of these forms.

A number of various catalysts and catalyst supports were investigated in a reaction system comprising a calibrated reservoir, metering pump, vaporizer, carburetor, preheater, catalyst tube, condensing system and wet test meter all connected in series. In operation a suitably proportioned mixture of vapors of methyl propionate and formaldehyde—and methanol and/or water vapor, when these were also present in the raw materials used—was led through an electrically heated and insulated tube to a preheated tube having a temperature-controlled electrical heating jacket. The preheated vapors passed directly from the preheater to a catalyst-packed reactor tube wherein the temperature was maintained as uniform as possible. The vapors issuing from the discharge end of the reactor tube were led to a condensing system including cold traps and suitable apparatus to measure and analyze the off-gas.

Before each run the system was flushed with inert gas, then each unit was brought to the desired temperature, and the flow of the mixture of reactants into the apparatus was then initiated.

The methyl methacrylate is recovered from the condensate by fractional distillation under reduced pressure, or by any other suitable technique.

This invention will now be further described in detail with reference to specific embodiments thereof, as illustrated by the example which follows:

EXAMPLE

A gaseous mixture of methyl propionate and aqueous formaldehyde in a mole ratio of 14:1 was passed through a catalyst packed reactor tube at atmospheric pressure, a temperature of 375° C., and a space velocity of 200 to 225 liters/hour/liter of catalyst. The formaldehyde used was a commercial aqueous solution containing 36 to 38% HCHO, 10 to 15% methanol as a preservative, balance water. A number of runs were made using various metal aluminosilicates as catalysts. The catalysts were prepared by base exchange of a water-soluble salt of the metal with a synthetic sodium aluminosilicate base exchange material sold under the trade name "Decalso" by The Permutit Company. The percentage conversion and yield, of methyl propionate and formaldehyde to methyl methacrylate both based on formaldehyde, are shown in Table I below.

*Table I*

| Run No. | Form of Decalso Catalyst | Percent Conv. | Percent Yield |
|---|---|---|---|
| 1 | Magnesium | 31 | 43 |
| 2 | Calcium | 38 | 52 |
| 3 | Strontium | 42 | 59 |
| 4 | Barium | 38 | 50 |
| 5 | Manganese(ous) | 42 | 60 |
| 6 | Lithium | 29 | 35 |
| 7 | Sodium | 33 | 39 |
| 8 | Potassium | 22 | 30 |
| 9 | Ammonium | 29 | 30 |
| 10 | Zinc | 32 | 36 |
| 11 | Lead | 33 | 33 |

The catalysts of the present invention are conveniently prepared by passing an aqueous solution of a soluble salt of the metal in the catalyst, such as the chloride, acetate or nitrate, through a bed of sodium Decalso for a time sufficient to effect exchange of the sodium ions with the ions of the catalyst metal, thereafter rinsing the bed with distilled water to remove any extraneous absorbed material, and then drying the rinsed material.

Preferred embodiments of the invention have been described in the foregoing text, but it is to be understood that the invention is not to be construed as limited thereby, except as defined in the appended claims.

We claim:
1. A process for the synthesis of methyl methacrylate which comprises contacting a vapor mixture comprising formaldehyde and methyl propionate with a zeolite catalyst material at a temperature at which methyl methacrylate is formed, and recovering methyl methacrylate from the resulting product.

2. The process of claim 1 wherein the catalyst is selected from the group consisting of the group II–A metal zeolites and manganous zeolite.

3. The process of claim 1 wherein the reaction temperature is about 325° to 425° C.

4. The process of claim 1 wherein the mole ratio of ester to formaldehyde is between about 2.5:1 and 50:1.

5. The process according to claim 1 where the mole ratio of ester to formaldehyde is between about 5:1 to about 15:1; and where the reaction temperature is about 350° C. to 400° C.

6. The process according to claim 5 where the catalyst is barium zeolite.

References Cited in the file of this patent

UNITED STATES PATENTS

| | | |
|---|---|---|
| 2,734,074 | Redmon | Feb. 7, 1956 |
| 2,821,543 | Etherington | Jan. 28, 1958 |
| 2,945,057 | McDaniel et al. | July 12, 1960 |
| 3,014,958 | Koch et al. | Dec. 26, 1961 |